May 2, 1950　　　　J. H. McLEOD, JR　　　　2,505,981
PNEUMATIC CONTROL SYSTEM
Filed Dec. 1, 1945　　　　　　　　　　2 Sheets-Sheet 2
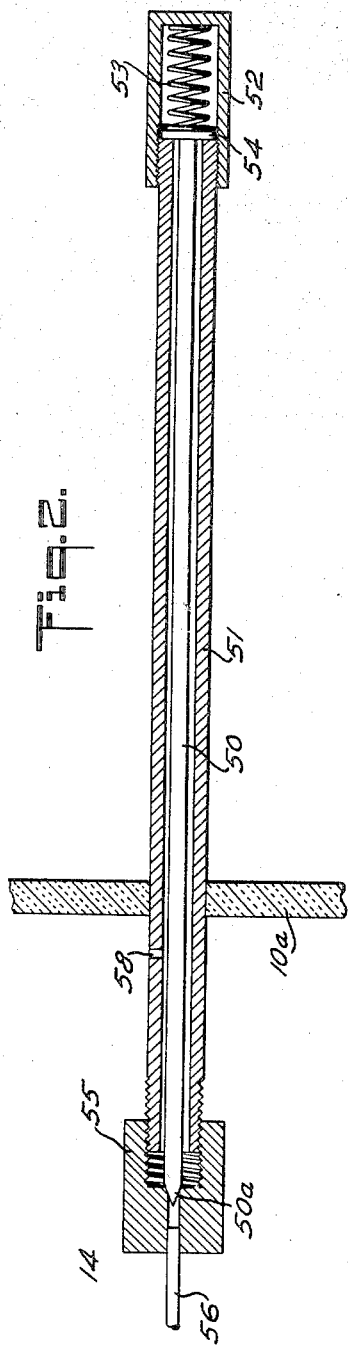
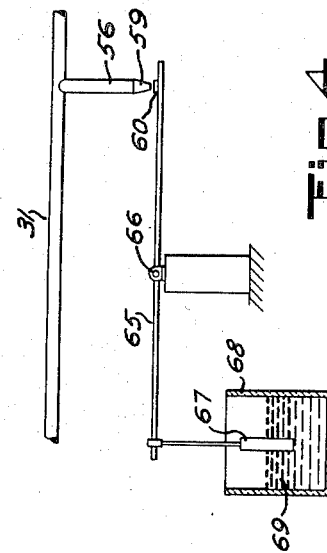
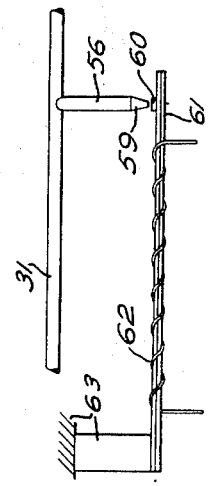
INVENTOR
JOHN H. McLEOD, JR.
BY
Virgil E. Woodcock
ATTORNEY Patented May 2, 1950

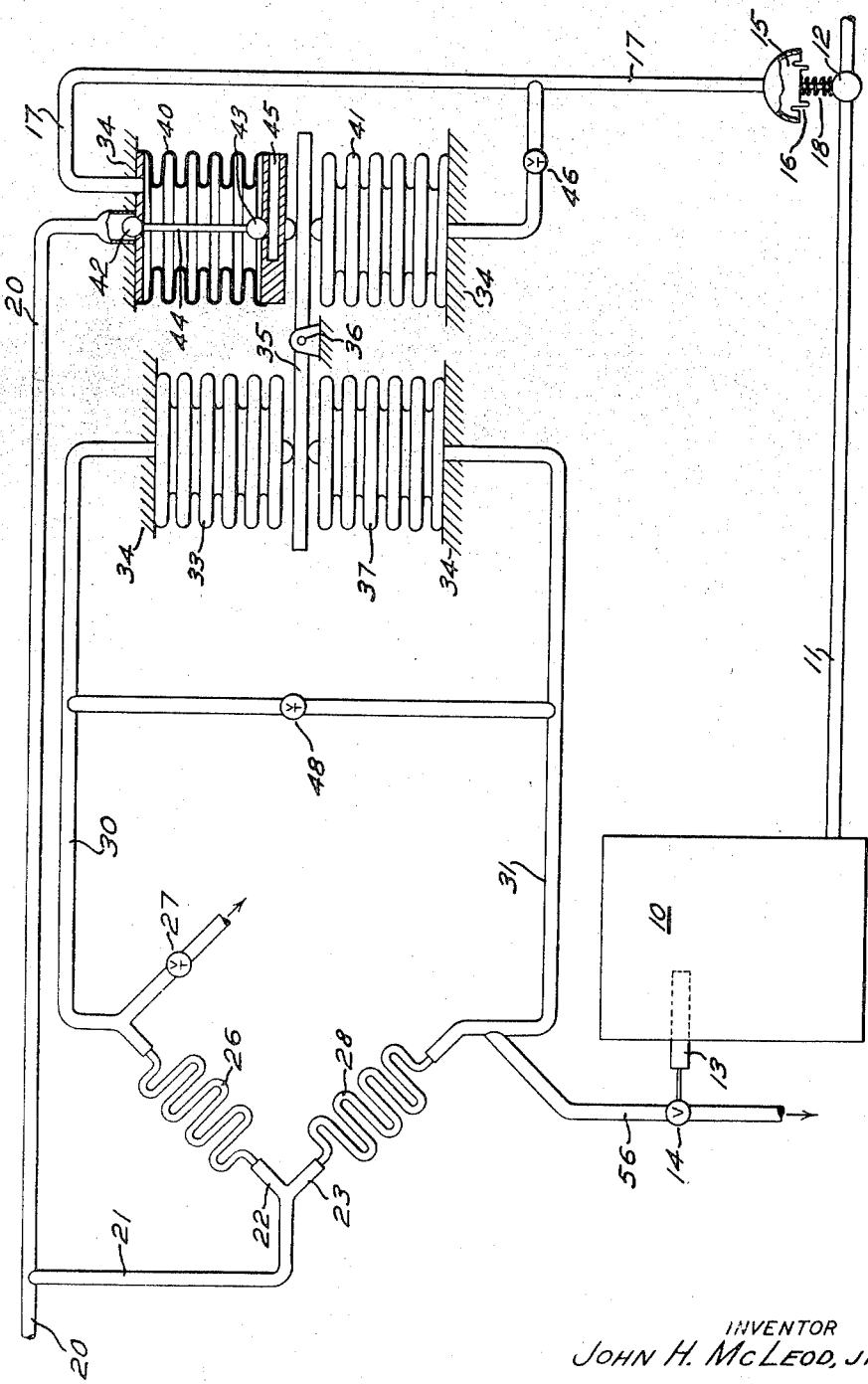

2,505,981

UNITED STATES PATENT OFFICE 2,505,981

PNEUMATIC CONTROL SYSTEM

John H. McLeod, Jr., Philadelphia, Pa., assignor to Leeds and Northrup Company, Philadelphia, Pa., a corporation of Pennsylvania Application December 1, 1945, Serial No. 632,182

3 Claims. (Cl. 236—82)

This invention relates to pneumatic systems for controlling the magnitude of a quantity or condition, as temperature, rate of flow, or other physical, chemical, or electrical condition or quantity, and has for an object the provision of a method of and a means for utilizing the unbalance between two pressures in such a manner to maintain the magnitude of a condition at a desired value.

It has heretofore been proposed to utilize pneumatic control systems for regulating the magnitude of a condition where the air pressure has been varied in response to changes in the magnitude of the condition. In many systems of this type, any change in the air pressure of the supply line directly affects the control system and thus changes the operation. Moreover, such systems have required hermetically-sealed pressure systems for operation of Bourdon tubes, bellows, and the like, thus limiting the location of the control apparatus with reference to the point at which the magnitude of the condition is measured.

In accordance with the present invention, there is provided a pneumatic control system which is substantially unaffected by changes in the pressure of the air supply. It is insensitive to ambient temperature, and it does not require hermetically-sealed pressure systems. There is no practical limit to the distance between the element responsive to changes in the magnitude of the condition and the location of the controlling apparatus. The system may be adjusted at the control station to compensate for air leaks in the line extending between the condition-responsive means and the controlling apparatus. In carrying out the invention in one form thereof, a pair of flow lines are connected to the air supply line, each flow line including a fixed flow-resistance means and a variable flow-resistance means. One of the variable flow-resistance means is adjusted in accordance with changes in the magnitude of a condition for producing a pressure in its branch line which varies as a function of the magnitude of the condition. The other variable flow-resistance means is adjusted to produce in its branch line that pressure which will exist in the other line when the magnitude of the condition is at a desired value. A means responsive to unbalance between the pressures in said branch lines is effective for returning the magnitude of the condition to the desired value. There may be included an automatic reset so that the controlling apparatus will operate independently of the demand or load and there may also be provided a means to produce one action for fast changes in the magnitude of a condition and a different action for slow changes. Further in accordance with the invention, there is provided a null system having few moving and no wearing parts; it uses little air though constantly operating to maintain the magnitude of a condition at a desired value.

For a more detailed description of the invention, and for further objects and advantages thereof, reference is to be had to the following description taken in conjunction with the accompanying drawings, in which:

Fig. 1, partly in section, diagrammatically illustrates a system embodying the invention;

Fig. 2 is an enlarged sectional view of the condition-responsive means illustrated in Fig. 1; and Figs. 3 and 4 illustrate other forms of a condition-responsive means which may be utilized in a system as illustrated in Fig. 1.

Referring to the drawings, the invention in one form has been illustrated as applied to the control of the temperature to be maintained in a chamber 10 which may be, by way of example, a heater or oven, or the like, having a heating means supplied by a fuel line 11 with a control valve 12 arranged to vary the amount of fuel delivered to the chamber 10 from a suitable source of supply. A condition- or temperature-responsive device 13 is located within the chamber 10 and is connected to a valve 14 which is opened and closed to extents proportional to changes in the magnitude of the condition.

The fuel supply valve 12 may be of a conventional pneumatically-operable type, having an air chamber 15 above a diaphragm 16. Air admitted to the chamber 15 by way of the pipe line 17 operates the valve 12 in opposition to resistance offered by the spring 18. In accordance with the invention, there is provided from an air supply line 20 a pipe 21 which leads to a pair of flow lines 22 and 23. The flow or branch line 22 includes a flow-resistance means 26 shown in the form of a tube of relatively great length. The branch line 22 also includes an adjustable flow-resistance means 27 which may be in the form of a needle valve. Similarly, the branch line 23 includes a flow-resistance means 28 and it also includes the valve 14 as the condition-adjusted flow-resistance means. While the fixed flow-resistance means 26 and 28 are illustrated in the form of tubes or pipes of great length, it is to be understood that they may comprise capillary tubing of relatively short length. They may consist of small orifices disposed in each branch line, or they may comprise adjustable valves set at predetermined positions. It is preferred that each of the tubular flow-resistance means 26 and 28 shall consist of a tube of such inner diameter as to minimize likelihood of fouling and which may be readily cleaned. It will be observed that pipe lines 30 and 31 are respectively connected to the branch lines 22 and 23 at points between the flow-resistance means 26—27 and 28—14. The line 30 terminates at and is connected to the interior of an expansible chamber or bellows 33 fixed at one end to a support 34. Its opposite end bears against a lever 35 pivoted at 36. Similarly, the line 31 is connected to the interior of an expansible chamber or bellows 37 having one end secured to the support 34 and its opposite end bearing against the opposite side of the lever 35. Since the bellows 33 and 37 oppositely act upon the lever 35, it will be understood that its position will be affected by the difference in the pressures in the lines 30 and 31.

In operation, the needle valve 27 will be opened a slight amount for flow of a small quantity of air to atmosphere. This will produce a predetermined pressure within the line 30, the magnitude of which will be determined by the pressure of the air in the line 20, the magnitude of the resistance interposed by the flow-resistance means 26, and the position of the needle valve 27. The pressure in the branch line 31 will be dependent upon the supply line pressure, the resistance of the flow-resistance means 28, and the setting of the valve 14. The condition-responsive means 13 functions to open the valve 14 a predetermined amount when the magnitude of the condition, such as temperature, is at a desired value. Accordingly, when the condition is at that desired value, the pressure in the line 31 will have a predetermined value. The valve 27 is adjusted to a position so that a like pressure will be developed in the line 30. Under these conditions, the bellows 33 and 37 will exert equal forces upon the lever 35 and since the forces are in opposite directions, the lever 35 will remain at standstill. However, if the condition-responsive means 13 operates the valve 14 from its former position, the pressure in the line 31 will be changed. The differential in pressure between the bellows 33 and 37 will then cause the lever 35 to be rotated about its pivot 36 either in a clockwise or counter-clockwise direction, depending upon the direction of the unbalance. Accordingly, the right-hand end of the lever 35, as viewed in Fig. 1, may be utilized directly to control the supply valve 12 as by provision of a valve operable by movement of the lever 35. Though not illustrated, this arrangement of the invention will be obvious from the description already set forth.

In the preferred form of the invention, there is provided adjacent the right-hand end of the lever 35 a pair of expansible chambers or bellows 40 and 41 respectively secured at the corresponding ends to the support 34 and having their opposite ends engaging the lever 35. The bellows 41 is connected to the line 17 by way of valve 46, to permit adjustment of the rate of resetting action. Within the chamber 40 is disposed a pair of valves 42 and 43 having their movable elements interconnected by a rod 44 which is operable by the expansion and contraction of the bellows 40. As shown, the valves are in their closed positions. Hence, air from the supply line 20 is not being admitted to the interior of the bellows 40. Similarly, air is not flowing through the valve 43 into an exhaust line 45 which leads to atmosphere. However, air pressure within the bellows 40 is applied by way of line 17 to the chamber 15 of the valve 12.

With the pressures in the bellows 33 and 37 equal, the lever 35 will remain in fixed position if the pressures within the bellows 40 and 41 are also equal. When the condition-responsive means 13 is in a position corresponding with a desired magnitude of the condition, the system as a whole may be in balance as described.

The reason for providing the bellows 41 will be hereinafter explained in detail. For the present, it will be assumed that the bellows 41 is omitted. For balanced conditions, the pressure in the bellows 33 will therefore be increased by closure of the valve 27 until the lever 35 will remain stationary when the condition-responsive device 13 occupies a position corresponding with a desired value in the magnitude of the condition. If the magnitude of the condition or temperature within the chamber 10 rises above its desired value, the condition-responsive means 13 will increase the opening of the valve 14 to reduce the pressure in the line 31 and in the bellows 37. The higher or unbalanced pressure in the line 30 and in the bellows 33 thereupon rotates the lever 35 in a counter-clockwise direction compressing the bellows 40 and opening the valve 42 to admit air from the supply line 20. The air is admitted and increases the pressure not only within the bellows 40 but also by way of the line 17 in the chamber 15, thereby operating the valve 12 to decrease the supply of fuel flowing in the line 11 to the chamber 10. The increased pressure in the bellows 40 causes it to expand and when the pressure rises sufficiently, the expansion of bellows 40 will produce clockwise rotation of the lever 35 to close the valve 42 upon return of the lever 35 to its original position.

A decrease in the magnitude of the condition, the temperature, within the chamber 10 produces operation of the valve 14 toward its closed position, thereby increasing the air pressure within line 31 and in the bellows 37. The higher or unbalanced pressure causes expansion of the bellows 37 to rotate the lever 35 in a clockwise direction. The bellows 33 is compressed and the bellows 40 expands. The expansion results in the opening of the valve 43 to connect the interior of the bellows 40 to atmosphere through the discharge line 45. The flow of air from the bellows 40 and from the line 17 reduces the pressure within the chamber 15 causing the valve 12 to move toward its open position. As the pressure is reduced in the bellows 40, the differential in pressure, as between the bellows 33, 37, and 40, disappears and the lever 35 is returned to its original position and the valve 43 is again closed. Though the system thus described may be useful in some applications, it possesses a drooping characteristic; that is, if the heat load in the chamber 10 increases, the pneumatic regulating system does not produce a flow of fuel in line 11 which fully restores the temperature to its desired value. The system does control the positioning of the valve 12 but as the heat load increases, the net result is a gradual lowering of the temperature in the chamber 10 as the heat load increases.

In the operation of the system as illustrated, and including the bellows 41, the drooping characteristic above described is eliminated. The bellows 41 provides an automatic resetting means for the control lever 35. It will now be assumed that the heat load of the chamber 10 has substantially increased with a corresponding reduction in the temperature thereof. Accordingly, the condition-responsive means 13 again functions to move the valve 14 toward its closed position, thereby increasing the pressure in the line 31 and in the bellows 37. As above described, the bellows 40 is expanded to open the valve 43, thereby to reduce the pressure within the bellows 40 and the line 17. Accordingly, the valve 12 is operated by the spring 18 toward its open position to supply more fuel through the line 11 to the chamber 10. The reduced pressure in the line 17 causes a reduction of the pressure in the bellows 41 at a rate dependent upon the setting of the adjustable valve 46. If the higher heat load persists, the pressure within the bellows 41 will be lowered to eventually equal the pressure of the line 17 and of the bellows 40. It will therefore be seen that the balancing of the pressure between the bellows 40 and 41 will permit the return of the lever 35 to its original position with the valve 12 in its new position. Thus, the bellows 33 and 37 will again be in pressure balance upon return of the temperature in the chamber 10 to its desired value. In accordance with the invention, the valve 12 will be positioned in accordance with the load demand of the chamber 10. The variable positioning of the valve 12 eliminates the drooping characteristic which would otherwise obtain, and, within the capability of the heating means, insures the maintenance of the desired temperature irrespective of load demand.

From the explanation thus far presented, it will be seen that the air pressure in the line 20 may be selected in terms of the requirements of the controlling device, such as the valve 12. It must be higher than the maximum pressure required to operate the valve 12 to its limit against the force of the spring 18. In a typical embodiment of the invention, the air pressure in the supply line 20 was 20 lbs. per square inch gage. To change the range of effective differential pressures on the bellows 33 and 37, the pivot 36 may be moved to the right as viewed in Fig. 1 to increase the ratio between the lever arm acted upon by the bellows 33 and 37 with reference to the lever arm acted upon by the bellows 40 and 41. If the ratio is as high as 100:1, the system will respond to differentials of pressure between the bellows 33 and 37 as low as .01 of the values required with a ratio of unity. With the lower differentials of pressure, the lever 35 will open or close the valves 42 and 43 in manner already described. The operation with the lower differentials of pressure and the longer lever arm decreases the proportional band; that is, the range of differential pressure required to move the valve 12 from fully open to fully closed positions or vice versa. In some applications, a narrower proportional band may be desired for certain operations, and for other operations a wider proportional band will be preferred. A more convenient proportional band adjustment may be provided by a needle valve 48 connected in a line which shunts or bypasses the bellows 33 and 37. By opening the needle valve 48, the effective differential of pressure in lines 30 and 31 as applied to the bellows 33 and 37 will be reduced. Thus, the desired width of the proportional band may be procured, depending upon the setting of the adjusting valve 48.

It is again emphasized, the invention is particularly directed to the bridge which includes the flow-resistance means 26 and 28. The pneumatic system characterizing the present invention has operating characteristics similar or analogous to those of the Wheatstone bridge used in electrical systems. For example, the flow resistance of the tubing or flow resistors 26 and 28 may be varied to change the ratio between them. Corresponding changes would then be made in the setting of the valve 27 with respect to the valve 14. Hence, it is to be understood that the flow resistors 26 and 28 may be made adjustable and they may comprise single capillary tubes or single orifices, or they may comprise orifices or capillary tubing connected in parallel. Similarly, the adjustable valve 27 may comprise capillary tubing having a flow resistance of a predetermined value. Since the flow resistors 26 and 28 produce proportional drops or reductions in the air pressure, it will be understood that the pressure applied to the bellows 33 and 37 may be of a relatively low order, as, for example, one lb. per square inch gage. The loss of air through the needle valve 27 and through the adjusting valve 14 is relatively small, and may total as little as two cubic feet per hour.

It is to be further understood that the pressures in lines 30 and 31 need not be equal to each other when the magnitude of the temperature in the chamber 10 is at a desired value. If such pressures bear a predetermined ratio with respect to each other, the same control action can be obtained. The only change needed would be to increase the diameter of the bellows 33 or 37, exposed to the lower pressure, or to decrease the diameter of the bellows exposed to the higher pressure. Alternately, the bellows exposed to the lower pressure may be moved farther from the fulcrum or pivot 36 or the pressure exposed to the higher pressure may be moved nearer to the fulcrum. In each case, the pressures in the respective arms of the bridge will maintain a predetermined relation, one to the other, for the desired operations of the lever 35. They will be maintained in the same ratio irrespective of variations in the pressure of the air supply line 20.

The valve 14 and the temperature-responsive device 13 may take the form illustrated in Fig. 2, where inner and outer elements 50 and 51 are made of materials of materially different coefficients of expansion. As shown, the outer element 51 comprises a tubular member having a substantially higher coefficient of expansion than an inner rod 50. The right-hand end of the member 51, as viewed in Fig. 2, is threaded to receive a cap 52 in which is disposed a compression spring 53 which bears against a circular plate 54 suitably secured to the end of rod 50. As shown, the left-hand end of the rod 50 is tapered to form the movable element 50a of the valve 14. The body part 55 is connected to a pipe 56 which leads to the line 31 and to the flow resistor 28. The device is arranged to be inserted into the chamber 10 as through an end wall 10a thereof. When subjected to heat, the outer tubular element 51 expands to a greater degree than the inner element 50. Accordingly, the valve parts 50a and 55 separate an amount related to the temperature applied to the elements 50 and 51 and their respective coefficients of expansion. It will therefore be seen that for each different temperature, the valve 14 will be opened a predetermined amount. The resultant change in pressure in the line 56 will produce operation of the system in manner already described. As the valve opens, air flows through the valve and outwardly through a vent 58.

For lower temperatures, provision is made to prevent damage to the valve by the spring 53, which it will be observed permits relative movement between the elements 50 and 51. Thus, as the outer element 51 contracts to a greater degree than the inner element 50, the spring 53 is compressed and the pressure applied to the valve in the closed position is limited by the strength of the spring 53.

Further in accordance with the invention, the materials for the inner and outer elements 50 and 51 may be selected so that the coefficients of expansion will bear a desired relation one to the other. The thickness or thermal characteristics of the outer element 51 may also be varied to suit particular operating conditions. For example, where control according to the rate of change of the condition is desired, the inner element 50 is arranged to be responsive to temperature changes at a relatively low rate. Accordingly, the outer element 51 will be directly exposed to the temperature, and upon a sudden variation therein it will dimensionally change to produce a corresponding rapid change in the setting of the valve 14. As the temperature of the inner element 50 approaches that of the element 51, it will decrease the changed setting of the valve until the final position will be dependent only upon the temperature and not upon the rate of change of temperature. To decrease the aforesaid rate-action, the elements 50 and 51 may be disposed in relatively good thermal contact, one with the other, or their surfaces may be so treated as to have high thermal emissivity characteristics for rapid transfer of heat by radiation.

The pressure-varying means need not be of the throttling valve type. As shown in Fig. 3, the line 56 may terminate in a nozzle 59, the end of which may be closed by means of a "flapper" 60 operated by a bimetallic strip 61 having a heating coil 62 fixed at one end to a stationary support 63. This modification is illustrative of devices which may be used in response to change in an electrical quantity for producing operation of the system of Fig. 1. Where an electrical condition is under control, the valve 12 may control a turbine, or a variable rheostat or other form of a controlling device may be substituted therefor.

As a further example of other condition-responsive means, reference may be had to Fig. 4 where a similar "flapper" 60 is utilized in conjunction with a nozzle 59. In this case, the "flapper" 60 is carried on a lever 65 pivoted at 66 and operable by a float 67 positioned within a vessel 68. The float 67 rises and falls with change in the level of liquid 69 held by the container 68. Other forms of condition-responsive means will readily suggest themselves to those skilled in the art, and it is to be understood that the invention is not limited to a particular form of condition-responsive means. It is to be further understood that variations as have been described may be made in the system as a whole, and it is therefore intended to cover such modifications which fall within the spirit and scope of the appended claims.

What is claimed is:

1. Pneumatic control apparatus operable from an air-supply line subject to pressure variations, a pair of flow lines connected to said air-supply line each including fixed flow-resistance means and each including variable flow-resistance means, means responsive to variations in the magnitude of a condition for adjusting one of said variable flow-resistance means for producing in its branch line at a point between said fixed and variable flow-resistance means a pressure varying as a function of the magnitude of said condition, means for adjusting the variable flow-resistance means in the other of said lines for producing at a point between said fixed and variable flow-resistance means a pressure therein equal to the pressure in said first-mentioned flow line when the magnitude of the condition is at a desired value, condition-changing means operable in accordance with the unbalance between said pressures in said branch lines at points between said fixed and variable flow-resistance means for returning the magnitude of said condition to said desired value and means interconnecting said points and including flow-resistance means adjustable to predetermine the width of the proportional band by varying the extent of operation of said condition-changing means for a given change in said unbalanced pressures.

2. Pneumatic control apparatus operable from an air-supply line subject to pressure variations, a pair of flow lines connected to said air-supply line each including fixed flow-resistance means in the form of capillary tubes and each including adjustable flow-resistance means, means responsive to variations in a condition for adjusting one of said adjustable flow-resistance means for producing in its branch line at a point between said fixed and adjustable flow-resistance means a pressure varying as a function of the condition, means for adjusting the adjustable flow-resistance means in the other of said lines for producing at a point between said fixed and variable flow-resistance means a pressure therein equal to the pressure in said first-mentioned flow line when the magnitude of the condition is at a desired value, opposed bellows operable upon unbalance between said pressures for returning the magnitude of said condition to said desired value and a by-pass connection shunting said bellows and including flow-resistance means adjustable to modify the differential of pressure applied to said bellows for a given change in magnitude of said condition.

3. In a pneumatic control apparatus operable from an air-supply line subject to pressure variations, the combination of a pneumatically operable condition-controlling device movable between off and on positions, a pivoted lever, a pair of bellows engaging said lever and effectively opposing each other, a second pair of bellows engaging said lever and effectively opposing each other, a flow-connection between said air-supply line and said condition-controlling device, said connection including means operable upon movement of one end of said lever for predetermining the pressure applied to said condition-controlling device, means for applying to said first pair of bellows the pressure applied to said condition-controlling device, means for controlling the action of said lever by said second pair of bellows comprising a pair of flow lines connected to said air-supply line each including fixed flow-resistance means and each including variable flow-resistance means, means responsive to variations in said condition from a predetermined magnitude for adjusting one of said variable flow-resistance means for producing in a first of said pair of lines at a point between said fixed and variable flow-resistance means a first pressure varying as a function of the magnitude of said condition, means for adjusting the variable flow-resistance means in a second of said pair of lines for producing at a point between said fixed and variable flow-resistance means a second pressure equal to said first pressure when the magnitude of the condition is at said predetermined value, means connecting said flow lines respectively from points between said fixed and variable flow-resistance means to the bellows of said second pair, and a flow-connection including a flow-restricting means interconnecting said first and said second lines of said second pair for modifying the action of said first pair of bellows and the resulting action of said condition-controlling device in establishing the magnitude of a condition at said predetermined value.

JOHN H. McLEOD, Jr.

REFERENCES CITED

The following references are of record in the file of this patent:

UNITED STATES PATENTS

| Number | Name | Date |
|---|---|---|
| 826,458 | Weld | July 17, 1906 |
| 875,957 | Saugstad | Jan. 7, 1908 |
| 1,404,311 | O'Neill | Jan. 24, 1922 |
| 1,455,633 | Lundgaard | May 15, 1923 |
| 1,974,187 | Malpass | Sept. 18, 1934 |
| 2,065,702 | Hubbard | Dec. 29, 1936 |
| 2,098,914 | Gorrie | Nov. 9, 1937 |
| 2,266,566 | Poole | Dec. 16, 1941 |
| 2,268,285 | Ivanoff | Dec. 30, 1941 |
| 2,275,317 | Ryder | Mar. 3, 1942 |
| 2,285,540 | Stein | June 9, 1942 |